US011880817B2

(12) United States Patent
Grant

(10) Patent No.: US 11,880,817 B2
(45) Date of Patent: Jan. 23, 2024

(54) ANTICIPATORY AND REMOTE-CONTROLLED MEDIA MANAGEMENT

(71) Applicant: NCR Corporation, Atlanta, GA (US)

(72) Inventor: Andrew Robert Grant, Dunblane (GB)

(73) Assignee: NCR Corporation, Atlanta, GA (US)

(*) Notice: Subject to any disclaimer, the term of this patent is extended or adjusted under 35 U.S.C. 154(b) by 200 days.

(21) Appl. No.: 17/362,269

(22) Filed: Jun. 29, 2021

(65) Prior Publication Data
US 2022/0414631 A1    Dec. 29, 2022

(51) Int. Cl.
| | |
|---|---|
| G06Q 10/00 | (2023.01) |
| G06Q 20/20 | (2012.01) |
| G06Q 20/18 | (2012.01) |
| G06Q 40/02 | (2023.01) |
| G06N 20/00 | (2019.01) |
| G06Q 50/26 | (2012.01) |
| G06Q 30/0226 | (2023.01) |
| G06Q 30/0204 | (2023.01) |
| G06Q 20/10 | (2012.01) |
| G07F 19/00 | (2006.01) |

(52) U.S. Cl.
CPC .......... *G06Q 20/203* (2013.01); *G06N 20/00* (2019.01); *G06Q 20/1085* (2013.01); *G06Q 20/18* (2013.01); *G06Q 20/202* (2013.01); *G06Q 30/0205* (2013.01); *G06Q 30/0226* (2013.01); *G06Q 40/02* (2013.01); *G06Q 50/26* (2013.01); *G07F 19/202* (2013.01)

(58) Field of Classification Search
None
See application file for complete search history.

(56) References Cited

U.S. PATENT DOCUMENTS

| | | | | |
|---|---|---|---|---|
| 7,130,807 | B1* | 10/2006 | Mikurak | G06Q 30/0202 |
| | | | | 705/7.31 |
| 10,977,889 | B1* | 4/2021 | McCabe | G06Q 20/202 |
| 2001/0044777 | A1* | 11/2001 | Haley | G07F 19/20 |
| | | | | 705/43 |
| 2004/0030622 | A1* | 2/2004 | Ramos | G06Q 40/00 |
| | | | | 705/35 |

(Continued)

OTHER PUBLICATIONS

JL Lázaro, ÁB Jiménez, A Takeda et al. (Improving cash logistics in bank branches by coupling machine learning and robust optimization), Expert Systems With Applications, 2018—Elsevier). (Year: 2018).*

(Continued)

*Primary Examiner* — Hafiz A Kassim
(74) *Attorney, Agent, or Firm* — Schwegman Lundberg & Woessner, P.A.

(57) ABSTRACT

A media level of each Self-Service Terminal (SST) within a customized group of SSTs are managed in real time based on a current media level and a predicted optimal media level for each SST over a given period of time. During management, depositors are proactively steered away from media heavy SSTs to media deficient SSTs within the group. Any given SST of the group may have deposits temporarily disabled based on real-time instruction. Depositors that are being redirected may be incentivized to encourage the depositors to deposit at the cash deficient SSTs of the group.

13 Claims, 3 Drawing Sheets

(56) References Cited

U.S. PATENT DOCUMENTS

| | | | |
|---|---|---|---|
| 2006/0065717 A1* | 3/2006 | Hurwitz | G06Q 20/02 |
| | | | 235/381 |
| 2010/0082355 A1* | 4/2010 | Folk | G06Q 30/0202 |
| | | | 705/7.31 |
| 2011/0125615 A1* | 5/2011 | Shirbabadi | G06Q 10/00 |
| | | | 705/28 |
| 2013/0073377 A1* | 3/2013 | Heath | G06Q 30/02 |
| | | | 705/14.39 |
| 2014/0046813 A1* | 2/2014 | Andrade Ramos Propeck | |
| | | | G06Q 40/00 |
| | | | 705/30 |
| 2014/0121830 A1* | 5/2014 | Gromley | G06Q 40/12 |
| | | | 700/236 |
| 2015/0058215 A1* | 2/2015 | Johnson | G06Q 20/1085 |
| | | | 705/43 |
| 2015/0278818 A1* | 10/2015 | Horgan | G07F 19/207 |
| | | | 705/43 |
| 2015/0287000 A1* | 10/2015 | Folk | G07F 19/202 |
| | | | 705/39 |
| 2018/0204424 A1* | 7/2018 | Licht | G07F 19/211 |
| 2018/0218323 A1* | 8/2018 | Nguyen | G06Q 40/02 |
| 2019/0034966 A1* | 1/2019 | Zaheer | G06Q 30/0261 |

OTHER PUBLICATIONS

RG Van Anholt, LC Coelho, G Laporte . . . (An Inventory-Routing Problem with Pickups and Deliveries Arising in the Replenishment of Automated Teller Machines)—Transportation Science, 2016—pubsonline.informs.org). (Year: 2016).*

* cited by examiner

ANTICIPATORY AND
REMOTE-CONTROLLED MEDIA
MANAGEMENT

BACKGROUND

Automated Teller Machines (ATMs) have become available to consumers in nearly every semi-populated area of the world. ATMs provide great convenience to consumers and to financial institutions (FIs), since they allow consumers to perform self-service transactions without the need to have a teller assist them within a bank during normal banking hours and they allow the FIs to maintain normal business hours and a reasonable level of staffing while satisfying the needs of the customers with availability to the FI's services.

A big concern for the FIs is the available currency at each of their ATMs. FIs prefer large capacity recyclers in their ATMs, so that any currency deposited at an ATM can subsequently be used for a withdrawal of currency. These large capacity recyclers increase the footprint, size, and weight of the ATM, which the FIs do not like and which is more expensive to ship, install, and maintain. It also generates more variants (configurations of recycler hardware to manage and more hardware parts need to be manufactured, managed, and quality controlled. But the FIs can live with the increased footprint, if they have the available space, because their primary concern is that the ATM maintains a sufficient level of currency needed to service their customers.

Managing the amount of available currency in each ATM at any moment in time, is a significant issue for the FIs. The ATMs require security when the cash is replenished, such that expensive cash security services have to be dispatched to the ATM. Moreover, too much currency in an ATM can also warrant dispatching the cash security services to the ATM to remove the excess currency.

A variety of factors can alter the available currency at any given ATM. For example, a sporting event in a local area may experience a larger than normal volume of cash withdraws on the day of the event. A given FI may have many different ATMs in the general vicinity of the sporting event such that only some of the ATMs in the vicinity experience a high volume of cash withdraws. Businesses in the area may also make cash deposits to the ATMs that are experiencing normal cash withdraws but not the ATMs that are experiencing larger than normal withdrawals. This can result in cash services being dispatched to many of the ATMs in the vicinity of the sporting event outside a normal planned replenishment schedule for the FI.

Another issue for the FIs is theft, thieves are aware of the high capacity recycler ATMs which make them a high-value target. When these ATMs are at or near capacity in currency, any theft can be particularly costly to the FIs. These thefts typically occur at night and typically occur in specific locations, but the FIs have no ability to manage the cash in these ATMs outside a normal replenishment schedule let alone based on the hours of a single day short of dispatching cash security services on a nightly basis to the ATMs, which is infeasible.

No currently available technology allows a FI to remotely control and manage the ATMs' currency levels at a fine-grain level of detail and on a real-time basis. Consequently, managing the currency levels of ATMs has become a reactive exercise, expensive, time consuming, and a maintenance headache for most FIs.

SUMMARY

In various embodiments, a system and a method for anticipatory and remote-controlled media management are presented.

According to an aspect, a method for anticipatory and remote-controlled media management is presented. A predicted media level for each Self-Service Terminal (SST) within a customized group of SSTs is obtained over a given period of time. A message is provided to a potential depositor to make a media deposit at a first SST of the customized group. The first SST identified as being deficient in media based on the predicted media level during the given period of time.

DETAILED DESCRIPTION

Figure 1:
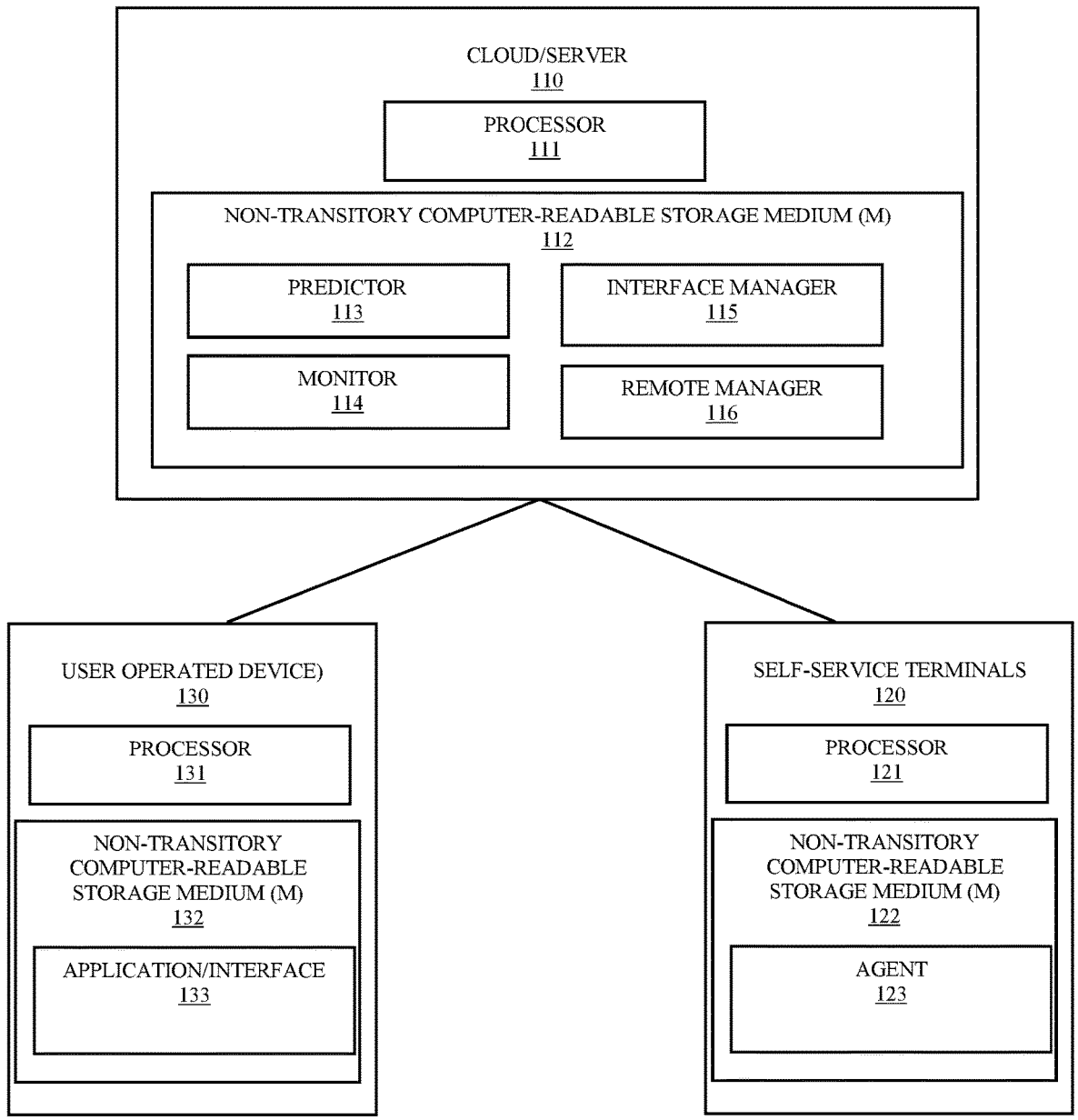
FIG. 1 is a diagram of a system for anticipatory and remote-controlled media management, according to an example embodiment.

FIG. 1 is a diagram of a system 100 for anticipatory and remote-controlled media management, according to an example embodiment. It is to be noted that the components are shown schematically in greatly simplified form, with only those components relevant to understanding of the embodiments being illustrated.

Furthermore, the various components (that are identified in FIG. 1) are illustrated and the arrangement of the components is presented for purposes of illustration only. It is to be noted that other arrangements with more or less components are possible without departing from the teachings of anticipatory and remote-controlled media management presented herein and below.

As will be discussed in the various embodiments that follow, the teachings provide anticipatory or predictive media management for a network of Self-Service Terminals SSTs along with remote control of operations available at the SSTs to control media levels. A mobile application (app) or browser interface provides customers real-time incentives to assist voluntarily in managing the network of SSTs' media levels by encouraging the customers to perform deposits and/or withdrawals at specific SSTs rather than a customer-desired SST. Furthermore, the app/interface provides a variety of real-time metrics and views of the media levels available within the network, a given SST, or a set of SSTs.

As used herein, "media" refers to currency, cash, printed tickets of value, tokens of value, etc. The term "media" may be used interchangeably and synonymously with the terms "currency" of "cash."

"Media level" refers to the total amount of media available within a given SST or custom set of SSTs. The media level may include totals for each denomination of currency, such as the total number of $100 bills, $50 bills, $20 bills, $10 bills, $5 bills, and $1 bills.

System 100 includes a cloud/server 110, a plurality of SSTs 120, and user-operated devices 130.

Cloud/Server 110 comprises at least one processor 111 and a non-transitory computer-readable storage medium 112. Medium 112 comprises executable instructions for a media predictor 113, a media monitor 114, an interface manager 115, and a remote manager 116. The executable instructions when executed by processor 111 from the medium 112 cause processor 111 to perform operations discussed herein and below with respect to predictor 113, monitor 114, interface manager 115, and remote manager 116.

Each SST 120 comprises a processor 121 and a non-transitory computer-readable storage medium 122. Medium 122 comprises executable instructions for an agent 123. The executable instructions when executed by processor 121 from medium 122 cause processor 121 to perform operations discussed herein and below with respect to agent 123.

Each user-operated device 130 comprises a processor 131 and a non-transitory computer-readable storage medium 132. Medium 132 comprises executable instructions for app/interface 133. The executable instructions when executed by processor 131 from medium 132 cause processor 131 to perform operations discussed herein and below with respect to app/interface 133.

Predictor 113 takes a variety of metrics and information as input and produces as output predicted media levels for a given SST 120 or a given set of SSTs 120 over a given period of time (such as a day or a week), each period of time is further broken down into intervals (such as every hour during a given day). The metrics comprise current media levels within each of the SSTs 120 in a group and current operating status of each of the SSTs 120. The information may include a geographic location of each SST 120 within the group, historical media levels for each SST 120, traffic patterns of customers at the geographic location, holiday schedules for a geographic region associated with the location, sporting or entertainment schedules associated with the geographic region, reported crime statistics associated with the geographic region, public transit schedules of the geographic region, business identifiers for businesses within a configured distance of each of the SSTs 120, types of businesses associated with the business identifiers, cash transit records that identify when the media levels were serviced for each of the SSTs 120, and replenishment schedules for when each of the SSTs 120 are scheduled to be replenished with media by cash transit services.

Predictor 113 may comprises a machine-learning model that based on the metrics and the information is trained to produce a media level prediction for each SST 120 for each interval of time over a period of time and trained to identify SSTs 120 that should have deposits directed to them or should have cash withdrawals directed to them for purposes of maintaining an optimal media level for a given SST during the period of time. The machine-learning model may comprise a neural network or a regression-based algorithm.

Predictor 113 once trained is executed in real time as each transaction is performed at the SSTs 120 with the current metrics and the information provided as input. Predictor 113 then produces the media level predictions for each SST in each interval over a given period and produces an optimal media level for each SST in each interval over the period.

Monitor 114 receives media metrics (cash deposit totals by denomination and cash withdrawal totals by denomination) from agent 123 of each SST 120. Monitor 114 also receives a current operating status of each SST 120 from each agent 123. Agent 123 sends the metrics to Monitor 114 each time a cash deposit or a cash withdraw operation is performed on its SST 120.

Monitor 114 also groups the SSTs 120 based on a configured geographical distance between the SSTs 120, such as 1 mile, 2 miles, a half of mile, etc. The information associated with a group of SSTs 120 is obtained from data sources. Each SST's information and current metrics for the group is provided by the monitor 114 to predictor 113 (along with a configured period of time) as each transaction is performed at any of the SSTs 120 with the group, as a configurable number of transactions are performed on the SSTs, or at a configurable interval of time (e.g., such as every hour, every two hours, once a day, etc.). Predictor 113 returns the time series media level predictions over the period and the optimal media levels for the period.

Monitor 114 identifies SSTs 120 within the group the SSTs 120 that are predicted to be deficient over the period in cash and SSTs 120 within the group that a predicted to have too much cash. Monitor 114 then obtains the optimal levels for each of the cash deficient SSTs 120 and each cash heavy SSTs 120 from the optimal media level prediction, and determines that cash withdrawals should be directed to the cash heavy SSTs 120 while cash deposits should be directed to the cash deficient SSTs 120 until the optimal media levels are reached for each SST 120 within the group.

Monitor 114 notifies interface manager 115 that customers depositing cash at the cash heavy SSTs 120 should be incentivized to deposit their cash at the cash deficient SSTs 120. Interface manager 115 interacts with a loyalty system of a financial institution to obtain an incentive, such as loyalty points, waiver of any fees, credits to the account, discounts on services, discounts on products of businesses partnering with the financial institution, rebates or free products, etc. The enterprise associated with cloud/server 110 may also maintain its own loyalty system with partnering businesses independent of or in addition to the financial institution (FI) associated with the group of SSTs 120.

Interface manager 115 identifies customers associated with businesses in the geographic region associated with the group of SSTs 120. These are businesses that likely perform cash deposits at one or more of the SSTs 120 within the group (based on transaction records of the SSTs 120). Manager 115 dynamically and in real time pushes an offer for the incentive to the businesses via app/interface 133. This is provided to encourage these businesses to make anticipated deposits into the predicted cash deficient SSTs 120 rather than the cash heavy SSTs 120. Interface manager 115 provides the incentive and the locations of the SSTs 120 that are predicted to be cash deficient.

Moreover, when monitor 114 determines that current media levels of a given SST 120 are too high based on evaluation of a policy, monitor 114 instructs remote manager 116 to turn off cash deposits at that SST 120. Remote manager 116 sends an instruction to the corresponding agent 123 of the SST 120 to shut down deposit operations and display a message to any depositor attempting to deposit at the SST 120 for that customer to perform their cash deposit at one of the cash deficient SSTs 120. The message may also display the address and/or directions to the cash deficient SSTs 120. In this way, a depositor is redirected from one SST 120 of the group that has too much cash to another SST 120 that is in need of or is anticipated to need more cash.

Remote control manager 116 may also receive a customer-provided instruction from a given FI or business associated with a given SST 120 that instructs manager 116 to turn off deposits at that SST 120 for a given period of time (between 8 p.m. and 7 a.m., between 5 p.m. on Friday until 7 a.m. on Monday, etc.). Manager 116 instructs the corresponding agent 123 to display a message to use one or more different SSTs 120 during the period of time and to turn off operations at the SST 120 associated with cash deposits.

Moreover, manager 116 notifies monitor 114 to adjust optimal media level operations for the group based on the SST 120 being offline for any cash deposit during the period of time.

Operations associated with cash withdrawals may be processed in a similar manner to what was discussed above with controlling cash deposits within the custom group of SSTs 120; however, withdrawals are typically considered a vital operation for customers of the FIs, such that in application, customers are unlikely to be redirected away from a given SST 120 within the group unless the SST 120 is out of cash or close to being out of cash.

Interface manager 115 may also provide FIs and businesses associated with managing SSTs 120 with a variety of interactive maps to visualize the current media levels of each of the SSTs 120 in real time. The maps may be overlaid with traffic patterns at the SSTs 120 (based on transactions occurring at the SSTs 120) and rendered as heat maps. The maps may be overlaid with crime statistics, public transportation schedules, replenishment schedules, and event schedules. The FIs and businesses can interact with the maps to obtain fine-grain details on a given SST 120 in terms of its total number of daily, weekly, monthly deposits and withdrawals, their customers making deposits at the SST 120 (an average amount of deposits per customer), time of day and day of week with the most deposits and withdrawals, etc. This allows the FIs to actively participate in managing the media levels associated with their SSTs 120 and provides the needed information to the FI for assisting in managing the media levels.

Currently, FIs utilize preplanned replenishment schedules for each of their SSTs 120 based on analyzed factors and based on the media levels of each SST 120. When an SST 120 requires replenishment, a cash transit service is used, which is costly to the FI. System 100 provides a mechanism by which FIs can proactively manage media levels of their SSTs 120 so as to minimize replenishment and cash transit services. Additionally, system 100 permits FIs to minimize theft loss by proactively reducing cash levels that are available in SSTs 120 at specific location and at specific times of the day or days of the week when thefts are most likely to occur. Still further, any business associated with managing an SST 110 can proactively turn off cash deposits when that business knows it will be out of town and unavailable to watch the SST 110.

System 100 proactively manages media levels of SSTs 120 within customized groupings of the SSTs 120. Deposits and withdrawals are steered to specific SSTs 120 within the group based on a variety of factors and based on an optimal media level provided by predictor 113. Depositors are incentivized with offers or rewards to redirect their deposits to SSTs 120 of the group that are considered to be cash deficient based on what the optimal levels are for those SSTs. Thus, the media levels are managed as a group but within that group, each SSTs 120 optimal media level is managed by monitor 114 utilizing predictor 113.

In an embodiment, the SSTs 120 are Automated Teller Machines (ATMs) or kiosks that dispense and accept deposits of valuable media.

The above-referenced embodiments and other embodiments are now discussed with reference to FIG. 2.

Figure 2:
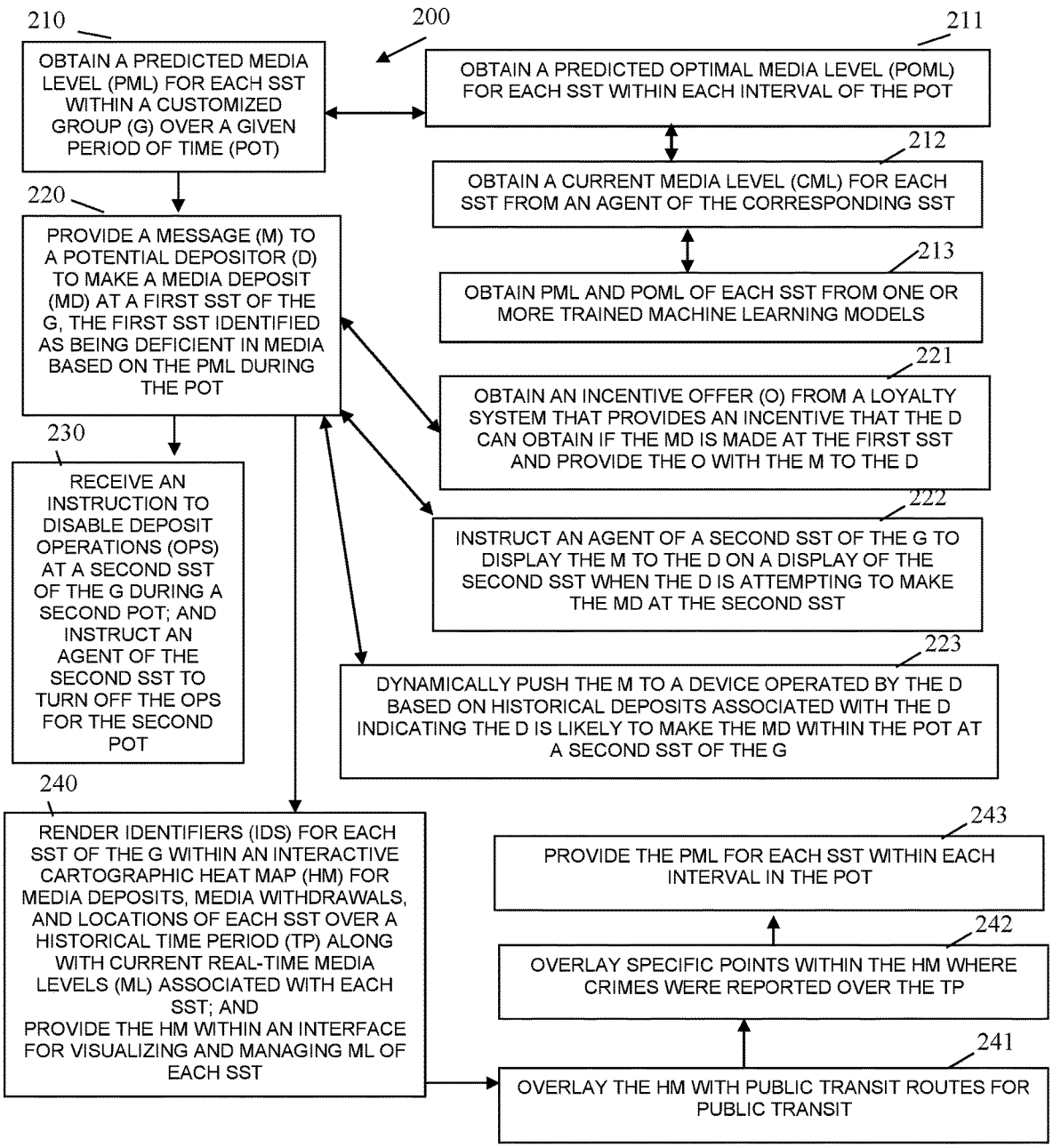
FIG. 2 is a diagram of a method for anticipatory and remote-controlled media management, according to an example embodiment.

FIG. 2 is a diagram of a method 200 for anticipatory and remote-controlled media management, according to an example embodiment. The software module(s) that implements the method 200 is referred to as a "media manager." The media manager is implemented as executable instructions programmed and residing within memory and/or a non-transitory computer-readable (processor-readable) storage medium and executed by one or more processors of one or more devices. The processor(s) of the device(s) that executes the media manager are specifically configured and programmed to process the media manager. The media manager has access to one or more network connections during its processing. The connections can be wired, wireless, or a combination of wired and wireless.

In an embodiment, the device that executes the media manager is cloud 110. In an embodiment, the device that executes media manager is server 110.

In an embodiment, the media manager is all of, or some combination of predictor 113, monitor 114, interface manager 115, and/or remote manager 116.

At 210, media manager obtains a predicted media level for each SST within a customized group over a given period of time.

In an embodiment, at 211, the media manager obtains a predicted optimal media level for each SST within each interval of the given period of time.

In an embodiment of 211 and at 212, the media manager obtains a current media level for each SST from an agent of the corresponding SST.

In an embodiment of 212 and at 213, the media manager obtains the predicted media level and the predicted optimal media level of each SST from one or more trained machine-learning models.

At 220, the media manager provides a message to a potential depositor to make a media deposit at a first SST of the customized group. The first SST is identified as being deficient in media based on the predicted medial level during the given period of time.

In an embodiment, at 221, the media manager obtains an incentive offer from a loyalty system that provides an incentive that the potential depositor can obtain if the media deposit is made at the first SST. The media manager provides the inventive offer to the potential depositor with the message.

In an embodiment, at 222, the media manager instructs an agent of a second SST of the customized group to display the message to the potential depositor on a display of the second SST when the potential depositor is attempting to make the media deposit at the second SST.

In an embodiment, at 223, the media manager dynamically pushes the message to a device operated by the potential depositor based on historical deposits associated with the potential depositor indicating that the potential depositor is likely to make the media deposit within the given period of time at a second SST of the group. The second SST of the group identified as having a media level that needs to be decreased.

In an embodiment, at 230, the media manager receives an instruction to disable deposit operations at a second SST of the group during a second period of time. The media manager instructs an agent of the second SST to turn off the deposit operations for the second period of time.

In an embodiment, at 240, the media manager renders identifiers for each SST of the group within an interactive cartographic heat map for historical media deposits, historical media withdrawals, and locations of each SST over a historical period of time along with current real-time media levels associated with each SST. The media manager provides the interactive cartographic heat map within an interface for visualizing and managing media levels of each SST within the group.

In an embodiment of 240 and at 241, the media manager overlays the heat map with public transit routes for public transit at the locations.

In an embodiment of 241 and at 242, the media manager overlays specific points within the heat map where crimes were reported over the historical period of time.

In an embodiment of 242 and at 243, the media manager provides the predicted media level for each SST within each interval of the given period of time, which is viewable when a user selects a given SST from the heat map.

Figure 3:
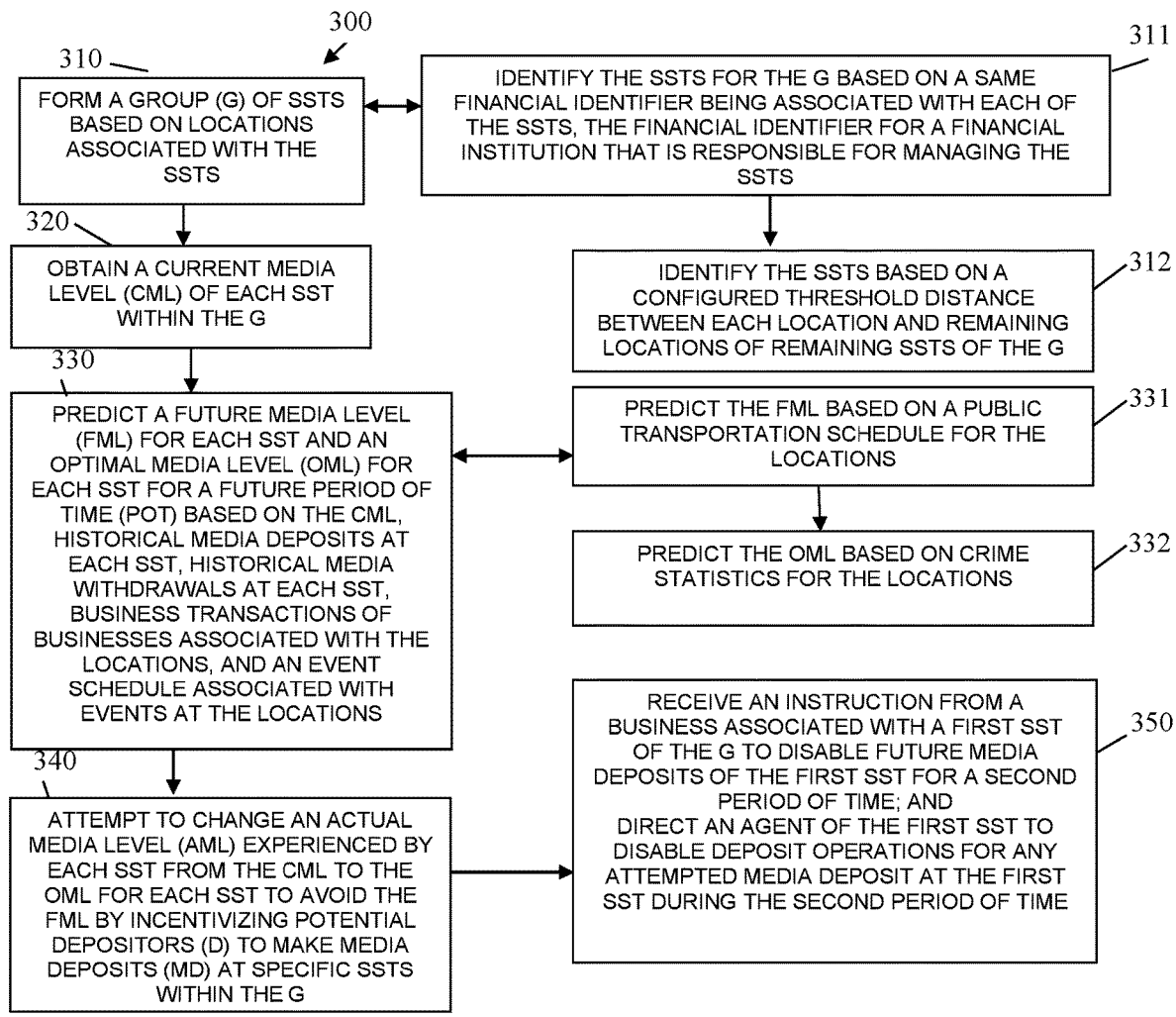
FIG. 3 is a diagram of another method for anticipatory and remote-controlled media management, according to an example embodiment.

FIG. 3 is a diagram of another method 300 for anticipatory and remote-controlled media management, according to an example embodiment. The software module(s) that implements the method 300 is referred to as a "real-time SST media level controller." The real-time SST media level controller is implemented as executable instructions programmed and residing within memory and/or a non-transitory computer-readable (processor-readable) storage medium and executed by one or more processors of one or more devices. The processor(s) of the device(s) that executes the real-time SST media level controller are specifically configured and programmed to process the real-time SST media level controller. The real-time SST media level controller has access to one or more network connections during its processing. The network connections can be wired, wireless, or a combination of wired and wireless.

In an embodiment, the device that executes the real-time SST media level controller is cloud 110. In an embodiment, the device that executes the real-time SST media level controller is server 110.

In an embodiment, the real-time SST media level controller is all of, or some combination of predictor 113, monitor 114, interface manager 115, remote manager 116, and/or method 200.

At 310, the real-time SST media level controller forms a group of SSTs based on locations associated with the SSTs.

In an embodiment, at 311, the real-time SST media level controller identifies the SSTs for the group based on a same financial identifier being associated with each of the SSTs within the group. The financial identifier identifies a FI that is responsible for managing media levels within the SSTs.

In an embodiment of 311 and at 312, the real-time SST media level controller identifies the SSTs based on a configured threshold distance between each location and remaining locations of remaining SSTs within the group. For example, all SSTs for a given FI that are within 1 mile of one another, such that one can get to each of the SSTs group by walking of driving less than a mile from a selected SST of the group.

At 320, the real-time SST media level controller obtains a current media level of each SST within the group.

At 330, the real-time SST media level controller predicts a future media level and an optimal media level for each SST for a future period of time based on the current media level of each SST, historical media deposits at each SST, historical media withdrawals at each SST, business transactions of businesses associated with the locations (transaction totals, time and date of transactions, day of week of transactions, etc. to infer customer traffic around the locations), and an event schedule associated with events planned for the locations.

In an embodiment, at 331, the real-time SST media level controller predicts the future media level based on a public transportation schedule available for the locations.

In an embodiment of 331 and at 332, the real-time SST media level controller predicts the optimal media level based on crime statistics for the locations.

At 340, the real-time SST media level controller attempts to change, in real time, an actual media level experienced by each of the SSTs from the current media level to the optimal media level to avoid the future media level by incentivizing potential depositors to make media deposits at specific SSTs within the group.

In an embodiment, at 350, the real-time SST media level controller receives an instruction from a business associated with a first SST of the group to disable future media deposits of the first SST for a second period of time. The real-time SST media level controller directs an agent of the first SST to disable deposit operations for any attempted media deposit at the first SST during the second period of time.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
obtaining, by a processor, a predicted media level for each Self-Service Terminal (SST) within a customized group of SSTs over a given period of time;
providing, by the processor, a message to a potential depositor to make a media deposit at a first SST of the customized group, wherein the first SST identified as being deficient in media based on the predicted media level during the given period of time; and
rendering, by the processor, identifiers for the SSTs of the customized group within an interactive cartographic heat map for historical media deposits, historical media withdrawals, and locations of each SST over a historical time period along with current real-time media totals associated with each SST;
providing, by the processor, the interactive cartographic heat map within an interface to a user for visualizing and managing media levels of the SSTs;
monitoring current media levels at each SST of the customized group;
determining a given current media level at a given SST of the customized group is high based on a policy;

physically controlling the given SST to shut down deposit operations on the given SST as long as the given current media level remains high based on the policy; and displaying a second message on the given SST indicating the deposit operations are shut down for the given SST and further indicating the first SST is available for the deposit operations.

2. The method of claim 1 further comprising:
receiving, by the processor, an instruction to disable deposit operations at a second SST of the customized group during a second period of time; and
instructing, by the processor, an agent of the second SST to turn off the deposit operations for the second period of time.

3. The method of claim 1, wherein rendering further includes overlaying the interactive cartographic heat map with public transit routes for public transit.

4. The method of claim 3, wherein overlaying further includes overlaying the specific points within the interactive cartographic heat map where crimes were reported over the historical time period.

5. The method of claim 4, wherein overlaying further includes providing the predicted media level for each SST within each interval in the given period of time.

6. The method of claim 1, wherein obtaining further includes obtaining a predicted optimal media level for each SST within each interval of the given period of time.

7. The method of claim 6, wherein obtaining further includes obtaining a current media level for each SST from an agent of the corresponding SST.

8. The method of claim 7, wherein obtaining further includes obtaining the predicted media level and the predicted optimal media level for each SST within each interval of the given period of time from one or more trained machine-learning models.

9. The method of claim 1, wherein providing further includes obtaining an incentive offer from a loyalty system that provides an incentive that the potential depositor can obtain if the media deposit is made at the first SST and providing the incentive offer with the message to the potential depositor.

10. The method of claim 1, wherein providing further includes instructing an agent of a second SST of the customized group to display the message to the potential depositor on a display of the second SST when the potential depositor is attempting to make the media deposit at the second SST.

11. The method of claim 1, wherein providing further includes dynamically pushing the message to a device operated by the potential depositor based on historical deposits associated with the potential depositor indicating that the potential depositor is likely to make the media deposit within the period of time at a second SST of the customized group.

12. A system, comprising:
Self-Service Terminals (SSTs);
user-operated devices;
a cloud or a server;
an SST processor of each SST executes SST instructions that cause the corresponding SST processor to perform first operations, comprising:
reporting media deposit transactions, media withdrawal transactions, and current media levels to the cloud or the server;
a user device processor of each user-operated device executes user device instructions that cause the corresponding user device processor to perform second operations, comprising:
rendering an interactive cartographic heat map of locations associated with the SSTs within an interface to a user; and
a processor of the cloud of the server executes instructions that cause the processor to perform third operations, comprising:
predicting a future media level and an optimal media level of each SST over a future period of time based on the corresponding media deposit transactions, the corresponding media withdrawal transactions, the corresponding media levels, and factors associated with the locations of the SSTs;
rendering and providing identifiers for the SSTs within the interactive cartographic heat map of the interface for historical media deposits, historical media withdrawals, and locations of each SST over a historical time period along with current real-time media totals associated with each SST;
providing the interactive cartographic heat map to the user through the interface for visualizing and managing media levels of the SSTs;
dynamically attempting to change the further media level of each SST to the optimal media level for each SST by sending incentives to the user-operated devices that are associated with potential depositors to identify specific ones of the SSTs that are to receive media deposits from the potential depositors;
monitoring current media levels at each SST;
determining a given current media level at a given SST is high based on a policy;
physically controlling the given SST to shut down deposit operations on the given SST as long as the given current media level remains high based on the policy; and
displaying a message on the given SST indicating the deposit operations are shut down for the given SST and further indicating a second SST is available for the deposit operations, wherein the second SST is selected from the SSTs based on a corresponding current media level for the second SST.

13. The system of claim 12, wherein the SSTs comprise Automated Teller Machines (ATMs) or kiosks.

* * * * *